(12) United States Patent
Walker et al.

(10) Patent No.: US 6,263,438 B1
(45) Date of Patent: Jul. 17, 2001

(54) METHOD AND APPARATUS FOR SECURE DOCUMENT TIMESTAMPING

(75) Inventors: Jay S. Walker, Ridgefield, CT (US); Bruce Schneier, Oak Park, IL (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/149,024

(22) Filed: Sep. 8, 1998

Related U.S. Application Data

(63) Continuation of application No. 08/622,034, filed on Mar. 21, 1996.

(51) Int. Cl.[7] .................................................. G06F 1/26
(52) U.S. Cl. ......................... 713/178; 713/182; 713/194; 713/200; 713/201; 380/243; 380/255
(58) Field of Search ................................. 713/178, 182, 713/194, 200, 201; 380/243, 255

(56) References Cited

U.S. PATENT DOCUMENTS

| Re. 34,954 | 5/1995 | Haber et al. . | |
|---|---|---|---|
| 3,943,336 | 3/1976 | Dillard et al. | ........................... 235/61 |
| 3,990,558 | 11/1976 | Ehrat . | |

(List continued on next page.)

FOREIGN PATENT DOCUMENTS

| 0 132 782 | 2/1985 | (EP) . |
| 0 154 972 | 9/1985 | (EP) . |
| 0 331 352 | 9/1989 | (EP) . |
| 0 440 021 | 8/1991 | (EP) . |
| 0 547 837 A2 | 6/1993 | (EP) . |
| 0 647 925 A2 | 7/1994 | (EP) . |
| 0 727 894 A1 | 8/1996 | (EP) . |
| 2 065 030 | 6/1981 | (GB) . |
| 3185551A | 8/1991 | (JP) . |

OTHER PUBLICATIONS

Gustavus J. Simmons, "Verification of Treaty Compliance—Revisited", Proceedings of the 1983 Symposium on Security and Privacy, Oakland, CA (Apr. 25–27, 1983).

"First Fully Authenticated Digital Video Surveillance System Features Advanced RSA Security Technology", Business Wire, Oct. 23, 1995.

W.M. Resnik, "Digital Image Authentication", 1996 RSA Data Security Conference Proceedings (Copies of slides handed out to meeting registrants), San Francisco, CA (Jan. 17, 1996).

Chen and Chen, "The Multisignatures of Time Stamp Techniques with ID–based Cryptosystem", Proceedings of the 10th International Conference on Information Networking, Jan. 29–31, 1996.

Haber et al., "Improving the Efficiency and Reliability of Digial Time–Stamping", Sequences II, Mar. 1992, pp. 329–334.

Haber et al., "How do Digital Time–Stamps Support Digital Signature?", Cryptobytes, Autumn 1995, pp. 14–15.

Welcome to Timestamp. com, www.timestamp.com, Download Date: Feb. 17, 2000.

(List continued on next page.)

Primary Examiner—Thomas R. Peeso
(74) Attorney, Agent, or Firm—Dean Alderucci; Nandu A. Talwalkar

(57) ABSTRACT

The invention relates devices and methods for creating a cryptographically assured timestamp that can be verified by a party that was not present during the creation of the timestamp. The timestamp is applied to physical documents, and other substrates capable of receiving an optically detectable mark, that are to be transmitted to temporally or spatially distant recipients.

50 Claims, 2 Drawing Sheets

U.S. PATENT DOCUMENTS

| | | | |
|---|---|---|---|
| 4,047,000 | 9/1977 | Bryant et al. | 235/151 |
| 4,108,364 | 8/1978 | Tanaka et al. | 235/419 |
| 4,123,747 | 10/1978 | Lancto et al. | 340/149 |
| 4,253,158 | 2/1981 | McFiggans | 364/900 |
| 4,376,299 | 3/1983 | Rivest | 364/900 |
| 4,423,415 | 12/1983 | Goldman . | |
| 4,489,318 | 12/1984 | Goldman . | |
| 4,546,352 | 10/1985 | Goldman . | |
| 4,568,936 | 2/1986 | Goldman . | |
| 4,637,051 | 1/1987 | Clark | 382/1 |
| 4,641,346 | 2/1987 | Clark et al. | 380/3 |
| 4,641,347 | 2/1987 | Clark et al. . | |
| 4,660,221 | 4/1987 | Dlugos . | |
| 4,663,622 | 5/1987 | Goldman . | |
| 4,686,527 | 8/1987 | Goldman . | |
| 4,689,477 | 8/1987 | Goldman . | |
| 4,725,718 | 2/1988 | Sansone et al. . | |
| 4,786,940 | 11/1988 | Daniele . | |
| 4,807,287 | 2/1989 | Tucker et al. | 380/23 |
| 4,831,438 | 5/1989 | Bellman, Jr. et al. . | |
| 4,835,713 | 5/1989 | Pastor | 364/519 |
| 4,855,580 | 8/1989 | Van Maanen | 235/440 |
| 4,868,877 | 9/1989 | Fischer . | |
| 4,972,480 | 11/1990 | Rosen | 380/46 |
| 5,001,752 | 3/1991 | Fischer . | |
| 5,022,080 | 6/1991 | Durst et al. . | |
| 5,027,395 | 6/1991 | Anderson et al. . | |
| 5,075,862 | 12/1991 | Doeberl et al. . | |
| 5,136,643 | 8/1992 | Fischer . | |
| 5,136,646 | 8/1992 | Haber et al. . | |
| 5,136,647 | 8/1992 | Haber et al. . | |
| 5,157,726 | 10/1992 | Merkle et al. . | |
| 5,189,700 | 2/1993 | Blandford . | |
| 5,347,579 | 9/1994 | Blandford . | |
| 5,367,573 | 11/1994 | Quimby | 380/25 |
| 5,375,172 | 12/1994 | Chrosny . | |
| 5,414,841 | 5/1995 | Bingham et al. | 395/600 |
| 5,448,641 | 9/1995 | Pintsov et al. | 380/51 |
| 5,463,547 | 10/1995 | Markowitz | 364/408 |
| 5,464,971 | 11/1995 | Sutcliffe | 235/379 |
| 5,467,447 | 11/1995 | Vogel . | |
| 5,490,217 | 2/1996 | Wang et al. | 380/51 |
| 5,497,419 | 3/1996 | Hill . | |
| 5,499,294 | 3/1996 | Friedman . | |
| 5,500,897 | 3/1996 | Hartman . | |
| 5,530,755 | 6/1996 | Pailles et al. . | |
| 5,615,268 | 3/1997 | Bisbee et al. . | |
| 5,629,980 | 5/1997 | Stefik et al. . | |
| 5,638,186 | 6/1997 | Motoyama | 358/448 |
| 5,638,443 | 6/1997 | Stefik et al. . | |
| 5,646,994 | 7/1997 | Hill . | |
| 5,649,185 | 7/1997 | Antognini et al. . | |
| 5,715,403 | 2/1998 | Stefik . | |
| 5,748,738 | 5/1998 | Bisbee et al. . | |
| 5,761,309 | 6/1998 | Ohashi et al. | 380/25 |
| 5,781,629 | 7/1998 | Haber et al. . | |
| 5,784,610 | 7/1998 | Copeland, III et al. . | |
| 5,828,751 | 10/1998 | Walker et al. . | |
| 5,831,859 | 11/1998 | Medeiros et al. | 364/478 |
| 5,848,426 | 12/1998 | Wang et al. . | |
| 5,923,763 | 7/1999 | Walker et al. | 380/51 |

OTHER PUBLICATIONS

"Overview. Digital Records are the Heart of your Business", www.surety.com/home/patents.html, Download Date: Feb. 17, 2000.

"Patent Overview", www.surety.com/home/patents.html, Download Date: Feb. 17, 2000.

Author Unknown, "Digimarc watermarking technology receives U.S. Patent", M2 Presswire, dated Jun. 16, 1997.

Author Unknown, "Keeping Message Secret", Federal Technology Report, dated Jul. 17, 1997.

Herrigel, A. et al., "Optical/digital identification/verification system based on digital watermarking technology"© 2000.

Russell Kay, "Sharing a Secret: How Kerberos Works", Computerworld, Dated Jul. 3, 2000. (http://www.nexis.com/research/search/submitViewTagged).

Author Unknown, "Solana develops 'digital watermark'technology", (http://www.nexis.com/research/search/submitViewTagged), download date Sep. 25, 2000.

Author unknown, "Bellcore Spins Off New Company to Offer Digital Notary", (http://students.cec.wustl.educs142/articles/ENCRYPION/digitalnotary), download date Sep. 26, 2000.

Verance Corporation (http://www.verance.com/technology.html), download date Sep. 26, 2000.

Author unknown, "Parallax Security Introduces "Exroy" the New Concept", PR Newswire, Apr. 28, 1988.

"Kerberos Authentication and Authorization System" The Massachusetts Institute of Technology, dated Oct. 27, 1988.

METHOD AND APPARATUS FOR SECURE DOCUMENT TIMESTAMPING

This application is a continuation of application Ser. No. 08/622,034, filed Mar. 21, 1996.

BACKGROUND OF THE INVENTION

1. Field of the Invention

The present invention relates generally to methods and apparatuses for document timestamping. More particularly, the invention relates to secure and authenticable timestamping of documents in such a way that the timestamp can be verified by a party who was not necessarily present during the timestamping.

2. Background

In many instances where timestamped documents are to be communicated to a temporally or spatially distant recipient, one would like to be able to verify the authenticity and integrity of the timestamp. For example, consider the problem of proving document creation in the course of business transactions. Both the author and the recipient would like to be able to timestamp the document in a manner that demonstrates to others that it was stamped: 1) by the timestamping device (i.e., knowing which device generated the timestamp), and 2) at the indicated time (i.e., that the timestamp has not been modified during or subsequent to timestamping). The first requirement relates to timestamping device authenticability, while the second requirement relates to time integrity. Either or both of these requirements may exist anytime documents are created by one party (or at one location) not under the direct control of the recipient. Common examples include timestamps at the top of fax pages, timestamps at the bottoms of printouts, and postage marks as evidence of mailing. Besides documents, other examples include timeclocks for hourly employees, or for parking garage patrons, for recording the date/time of entry onto the premises.

As indicated by the above examples, many timestamping applications are associated primarily with physical (e.g., paper-based) applications rather than electronic (e.g., digital) applications. This is especially true for document generation where, despite the almost universal use of computer word processing, the majority of documents are still used and stored on paper because of its advantages over electronic media. Such advantages include: 1) ease of document creation (e.g., taking handwritten notes), 2) ease of document retrieval (e.g., without computers or other specialized document readers and no worries about evolving diskette or word processing file formats), 3) long-term stability of paper (e.g., degradation of magnetic media), 4) low cost, and 5) portability. Therefore, a timestamping device for everyday usage should be particularly suitable for use with paper-based documents.

Traditionally, timestamping devices have relied on mechanical inaccessibility, fixed location, and public display to suggest the accuracy of timestamps produced thereby. Many contemporary electronic timestamping devices provide even less assurance than mechanical devices because their timestamping mechanisms are user-accessible, user-resettable, and hidden from public view. Examples include camera date recorders to timestamp pictures, answering machine/voicemail date/time recorders, and computer clocks to timestamp file creation and output such: timestamps on document trailers.

Whether mechanical or electronic, each of the above-mentioned examples is prone to resetting of the clock prior to timestamping, or modification of the timestamp after timestamping. For example, the ability to reset the internal date/time is built into almost all personal computer operating systems. Furthermore, the purely electronic devices are especially prone to tampering because of the ease with which a purely electronic document to be timestamped can be accessed and manipulated. Such ease of manipulation has led to the creation of devices which cryptographically certify the authenticity and integrity of electronic documents. Examples of such devices may be seen in several US patents (U.S. Pat. Nos. 5,189,700; 5,157,726; 5,136,647; 5,136,646; 5,022,080; 5,001,752; and 4,786,940) disclosing devices that input digital data, crytographically certify the digital data, and output a digital message. In addition, certain of these devices optionally add time from a secure internal clock to the digital message.

The aforementioned devices are directed at applications whose primary goal is digital data certification, and any associated timestamping is an adjunct to that goal. In contrast, in many document timestamping applications, the primary goal is time certification rather than data certification. Although the data certification devices can be used for timestamping, such usage would be relatively complicated, expensive, and ill-suited for paper-based timestamping applications because the document data must be digitized. For example, the use of data certification devices with paper documents would require the addition of a document scanner to generate a digital representation of the document for input to the device, leading to increased device cost and complexity.

Furthermore, because data representing the document would be included in the cryptographic message, one wishing to verify the message (e.g., by recomputing the timestamp) would also have to create a digital representation of the message—a costly and possibly infeasible operation for those with limited capabilities. It is often inefficient to timestamp a paper document such that verification of the timestamp requires the timestamp recipient to re-digitize the paper document.

Therefore, there exists a need for a simple, inexpensive, easy-to-use device that generates an accurate and unalterable timestamp, for application to physical media such as paper documents, that can be easily verified by the document recipient.

SUMMARY OF THE INVENTION

An object of the present invention is to provide methods and devices for generating a timestamp whose authenticity and integrity can be verified by a recipient of the timestamp. As used herein, the term "timestamp" shall refer to the output generated by a "timestamping device" and could include clear text and/or ciphertext portions.

In connection with the foregoing, in one embodiment of the invention, a timestamping device encloses a battery-powered clock, a cryptographic processor, and a memory within a tamper-resistant environment. The cryptographic processor performs a cryptographic operation on a representation of time to produce a cryptographically assured timestamp. As used throughout this document, the term "timestamp" shall be understood to include date, time, day-of-week and any other measurement produced by a chronographic device. In many cases, such measures are effectively synonymous; for example, many computer clocks record time as the number of seconds elapsed since Jan. 1, 1900, which is easily converted to date and day-of-week formats.

The degree of cryptographic processing depends on the degree of security that is desired. For example, where the primary concern is time integrity, a simple one-way algorithm, e.g. a hash, message authenticity code (MAC), or cyclic redundancy check (CRC), applied to the time, might be adequate. Where the timestamping device is used to timestamp a sequence of messages, a chain of hashes— where each timestamp also includes representations of one or more previous messages—provides an additional degree of message authenticity. In other cases, the timestamping device might sign the time with a device-specific private key, to provide authenticity in addition to integrity. Even greater assurance can be provided by adding unique device IDs, witness IDs, challenge-response protocols, digital certificates, combinations of symmetric and asymmetric (public key) encryption, and many other cryptographic techniques, in patterns appropriate to the particular application at hand.

In another embodiment of the invention, the timestamping device need not generate its own time internally. Rather, the timestamping device may include a receiver to obtain time from a Global Positioning Satellite (GPS), radio signals from the US Naval Observatory atomic clock, or any other reliable external source. External time signals are especially advantageous for deterring hacking of an internal clock. The receiver could either replace or supplement the clock. In addition, the clock could be used to double-check the received time (or vice-versa) by comparing the received time against the internal clock time. The received time would be deemed accurate if the two times agreed to within the cumulative inaccuracies of the received signal (external time source inaccuracy plus any uncorrected transmission delay) and the internal clock. Finally, the cryptoprocessor could be programmed to receive time signals encrypted in the time transmitter's private key, or in the receiver's public key, as an extra measure of assurance that an impostor has not substituted an incorrect time for that of the broadcast source.

The timestamp may be outputted to a physical medium in any optically detectable format. Suitable output devices include handheld printers, facsimile machines, computer printers, copiers, or any other document production device. Alternatively, it is also possible to output the timestamp via alpha-numeric displays and optical data recording devices. Finally, the output device need not be physically located with the rest of the timestamping device. For example, a centrally located timestamping device could have one or more remotely located output devices accessible via broadcast signals or data or voice networks. Such configuration would be especially useful for remote time notarization applications.

Furthermore, the timestamp may be outputted at a variety of frequencies, for example: 1) at predetermined times, 2) upon request of either the user or the recipient, 3) upon presentation of a request encrypted in a public key corresponding to the private key of the timestamping device, 4) upon production of data by the output device (e.g., a document production device), or 5) under control of a broadcast signal.

A recipient of the timestamp can determine timestamping device authenticity and time integrity by verifying the cryptographic operation used to generate the timestamp. For example, in the case of a hashed time, the recipient can verify the timestamp by recomputing the hash of the cleartext time and comparing it with the received hash (the ciphertext portion of the timestamp). The hash could even be a keyed operation to provide greater security. Or, if the timestamp was encrypted with the device private key, the recipient can use the corresponding device public key to decrypt and verify the timestamp. The public key could either be obtained from a public database or distributed using digital certificates within the timestamp. Alternatively, instead of public/private key pairs, the timestamping device could use a symmetric key—either alone or in combination with public key cryptography.

The timestamp may include additional features to increase confidence therein. For example, the timestamp could include a unique device ID to identify itself to a timestamp recipient. Furthermore, the timestamping device could prevent re-use of a previous timestamp by using a challenge-response protocol in which the requester transmits a random number to the timestamping device for inclusion in the timestamp. Alternatively, the timestamping device could contain a random number generator for internal generation of the random number. Those skilled in the art will appreciate that the challenge can use any datum whose value is unpredictable by the recipient; random numbers happen to be a particularly convenient choice.

The features and advantages of the present invention will be more readily understood and apparent from the following detailed description of the invention, which should be read in conjunction with the accompanying drawings, and from the claims which are appended at the end of the detailed description.

DETAILED DESCRIPTION OF THE INVENTION

Devices and methods are disclosed for generating a timestamp which may be verified by a party that was not necessarily present at the time of creation of the timestamp. For example, the timestamp could be used to record the time at which a document was printed, a photocopy was made, or a facsimile was received.

In this disclosure, certain ancillary elements used in conjunction with the timestamping device are well understood to those skilled in the art and are not shown in order not to obscure the present invention. For example, the design and construction of clocks, computer memories, and software or hardware cryptographic algorithms, are well known to those skilled in the art and will not be described in detail herein.

Timestamping Device and Timestamping Operations

Figure 1:
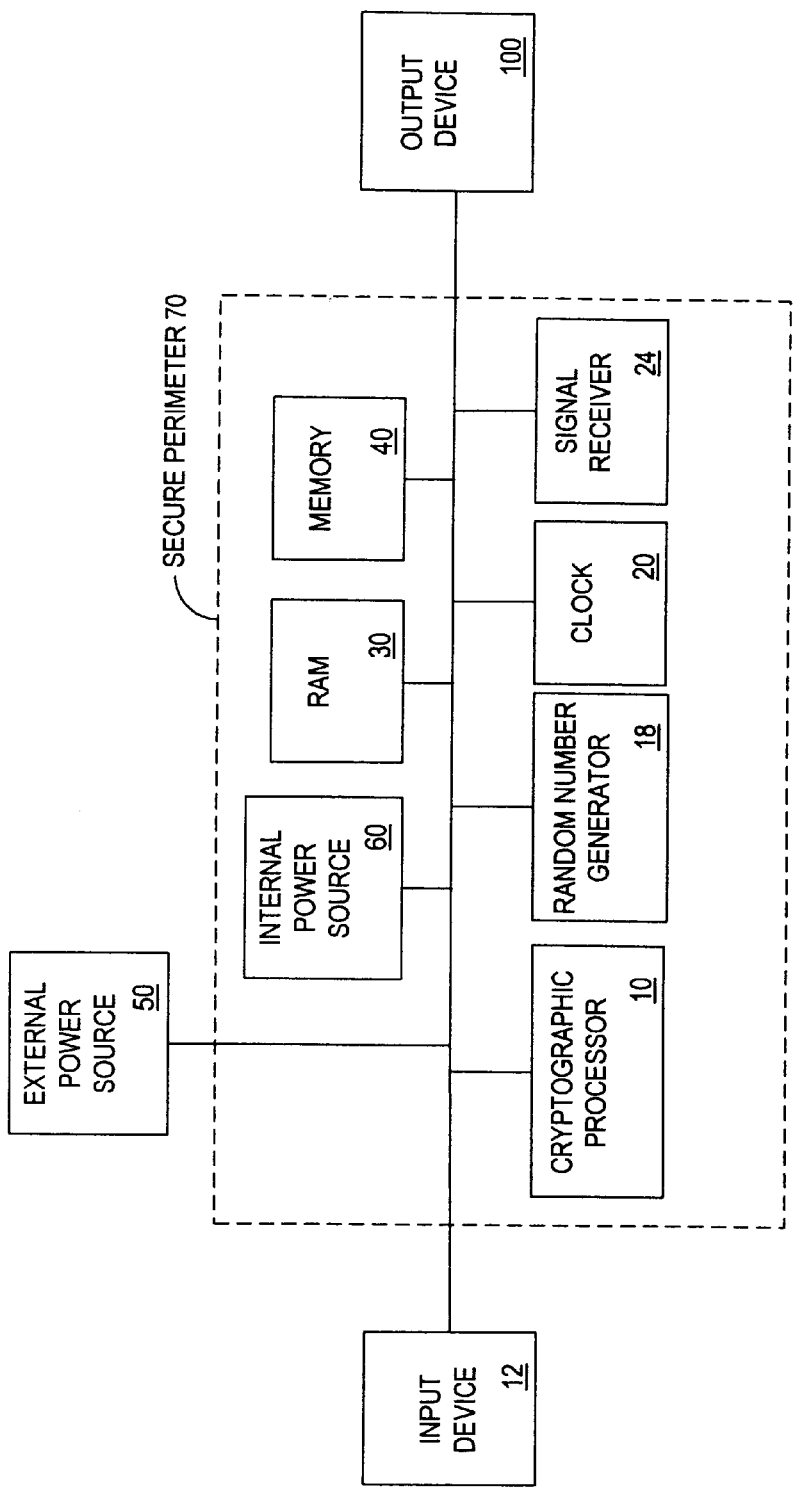
FIG. 1 illustrates the basic components of a device for secure timestamping.

Referring now to FIG. 1, there is shown one embodiment of a timestamping device including a cryptoprocessor 10, a clock 20, random access memory (RAM) 30, nonvolatile memory 40 and output device 100. The cryptoprocessor 10 can be a general purpose processor (e.g., an Intel CPU) receiving instructions from RAM 30 or memory 40, or it can be a special purpose processor optimized for performing cryptographic operations (e.g., a National Semiconductor iPower SPU). That is, the cryptoprocessor may comprise any hardware or software engine capable of performing cryptographic operations on a given quantity. As described in greater detail below, such operations may include both keyless and keyed operations, as well as various combinations thereof. The cryptoprocessor 10 and clock 20 are powered by external power source 50, with standby battery 60 to ensure operability during replacement or absence of external power source 50. Thus, external power source 50 could be an user-replaceable battery or an AC power source. Alternatively, the device could be powered by internal battery 60 alone (in which case the device stops functioning at battery death) or external power source 50 alone (necessitating resetting the clock from a trusted external time source—e.g., the GPS satellite signals discussed below—upon powerup).

The cryptoprocessor 10, clock 20, RAM 30, memory 40 and the control signals for output device 100 are contained within secure perimeter 70, making these components resistant to external tampering. Secure perimeter 70 may include physical, electronic, or a combination of physical and electronic features to resist tampering. For example, physical features could include encapsulation, electronic features could include a silicon firewall, and combination features could include self-zeroizing, or otherwise volatile, RAM 30 or memory 40 which electrically modifies its contents upon detection of tampering. Such tampering might include physically stressing the device, attempting to change the clock rate by replacing external power source 50 with a battery outside allowable current or voltage ranges, or attempting to change the clock rate by replacing external power source 50 with an AC power source outside an allowable frequency range. Alternatively, secure perimeter 70 could be merely tamper-evident. In that case, the process of timestamp verification should include checking the timestamping device for evidence of tampering. As will be appreciated by those skilled in the art, a great variety of tamper-resistant/tamper-evident techniques can be deployed, and will not be enumerated in detail herein. Therefore, as a matter of convenience, terms such as "tamper resistant" or "secure" shall be understood to refer to any of the aforementioned or other security measures throughout this discussion.

In the simplest embodiment of the invention, the timestamping device generates a time from clock 20 and outputs a timestamp (or message) consisting of the cleartext time plus a one-way function representative of the time. As used herein, a one-way function is one that outputs a unique representation of an input such that a given output is likely only to have come from its corresponding input, and such that the input can not be readily deduced from the output. Thus, the term one-way function includes hashes, message authenticity codes (MACs—keyed one-way functions), cyclic redundancy checks (CRCs), and other techniques that are well known to those skilled in the art. See, for example, Bruce Schneier, "Applied Cryptography," Wiley, 1996. As a matter of convenience, the term "hash" will be understood to represent any of the aforementioned or other one-way functions throughout this discussion. Typically, the hash would be performed by cryptoprocessor 10 using a hard-wired hashing algorithm or one stored in RAM 30 or memory 40. The hash may either be a keyed or keyless operation.

Furthermore, a unique device identification number, stored in RAM 30 or memory 40, can be added to the hash to provide assurance of message authenticity. A recipient wishing to verify the time would read the time and device ID, then perform an identical hashing algorithm to recompute the hash. If the received and recomputed hashes agree, the recipient is assured that the timestamp came from the timestamping device and had not been altered subsequent to timestamping.

Where the timestamping device is used to timestamp a sequence of messages, a chain of hashes—where each timestamp also includes representations of one or more previous messages—provides an additional degree of message assurance. For example, RAM 30 or memory 40 could store a hash of the last three time stamps to be incorporated into the current timestamp, as shown in the following example. Imagine that timestamping is performed once monthly, with the latest four dates being: 11/19, 12/15, 1/13, and 2/24. The hash for the last timestamp could be Hash__2/24=Hash("2/24")+Hash__11/19+Hash__12/15+Hash__1/13, with the hashes for the November, December and January dates relating to their respective previous three months in a similar fashion. The chained hashes discourage fraudulent modification of a timestamp as described below.

Suppose a forger discovers the device private key and uses it to change both the cleartext and hashed portions of the 11/19 timestamp to read 11/9. A suspicious party could challenge the temporally altered 11/19 timestamp by using it to recompute the subsequent three timestamps, and comparing them with their known values. If the known and recomputed timestamps disagree, the 11/19 timestamp is demonstrated to have been altered. When tampering is generally suspected but no specific timestamp is in question, an altered timestamp can be discovered by recomputing the most recent timestamp and continuing backward until three successive unconfirmable timestamps are found, indicating that the next timestamp in sequence has been altered. Of course, the forger could theoretically change all the timestamps in the chained hash, but this would require more effort than changing just the desired one, and would increase the chances of detection.

Still greater assurance of integrity and authenticity can be obtained by encrypting part or all of the timestamp in cryptoprocessor 10 using a key stored in memory 40. For example, instead of hashing, the time might be encrypted with a device-specific private key if authenticity is required, and possibly also with a recipient-specific public key, if confidentiality is desired.

Certain well-known enhancements to public key cryptography can also be used to provide greater assurance. For example, the message could include digital certificates for public key distribution to a party that does not know the device public key needed to verify a timestamp encrypted with the device private key. In a digital certificate, the device public key is encrypted (and vouched for) by the private key of a trusted certifier (e.g., a well known manufacturer of the timestamping device) whose public key is known to the recipient. The recipient uses the certifier's public key to decrypt the device public key, then uses the device public key to verify the timestamp. Alternatively, the recipient could simply obtain the device public key from a publicly accessible database, eliminating the need for digital certification.

To this point, asymmetric (public key) encryption has been discussed in the context of the various cryptographic operations. However, symmetric key (e.g., DES) key encryption is also possible, either as a replacement for, or adjunct to (e.g., a symmetric session key transmitted using public key cryptography) public key cryptography.

Another commonly used cryptographic technique, the so-called challenge-response protocol (CRP), may be used to ensure to a recipient that a timestamp is current, i.e., not a copy of a previously used timestamp. In the CRP, a timestamp requester challenges the timestamping device by transmitting a datum to the timestamping device, and checking for the same datum in the received response. Thus, reused timestamps are prevented (or at least detectable) because a reused timestamp would contain a datum corresponding to a previous request/reply pair, rather than the current datum. Those skilled in the art will appreciate that the challenge can use any datum whose value cannot be predicted by the recipient; random numbers happen to be a particularly convenient choice. Alternatively, the timestamping device could include a random number generator 18 to generate random numbers internally. In this somewhat weaker version of the CRP, the recipient would not necessarily know that the timestamp was unique, but only that he had not been sent a copy of a timestamp he himself had previously received.

Although certain exemplary cryptographic operations (hashing, asymmetric encryption, symmetric encryption, digital certificates, and challenge-response protocols) have been disclosed for use singly or in specified combinations, those skilled in the art will appreciate that many other combinations of these basic operations may be used, depending on the needs of the specific application.

The timestamp can be created and outputted upon receipt of a timestamping request at input device 12. Input device 12 might be a simple I/O port for receiving an external electronic signal, or could include a push-button or other mechanical device to generate the timestamp request. In the case of an electronic signal, the cryptoprocessor 10 might only accept a request encrypted with a public, private, or symmetric key, and the cryptoprocessor 10 would then verify the timestamp request prior to providing the requested timestamp. The external electronic signal could be generated by a remote location which broadcasts or otherwise transmits the timestamp request to the timestamping device.

Alternatively, the time request could be internally generated under control of the cryptoprocessor 10, according to a predetermined schedule, having either regular or irregular intervals, loaded in RAM 30 or memory 40. Timestamping in response to a predetermined schedule, rather than requester control, would be useful in applications such as remote monitoring or event logging. The schedule could either be factory loaded (and unalterable) or loadable through input device 12. In the latter case, a request to load the schedule would preferably be encrypted in the device public key, as described above with respect to requester timestamping. As yet another alternative, timestamping could be dynamically controlled using an algorithm in which a future timestamp is set in response to one or more previous timestamps. For example, in certain monitoring applications, a normally infrequent timestamping schedule could be accelerated in response to detection of targeted events.

Figure 2A:
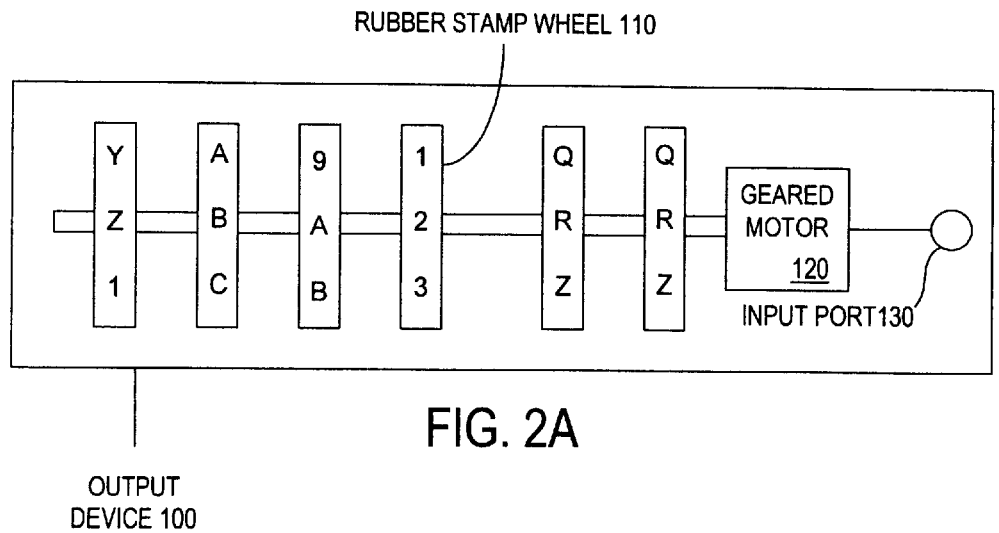
FIGS. 2A,B illustrate bottom and end views, respectively, of a timestamp printer for use with paper documents.
Figure 2B:
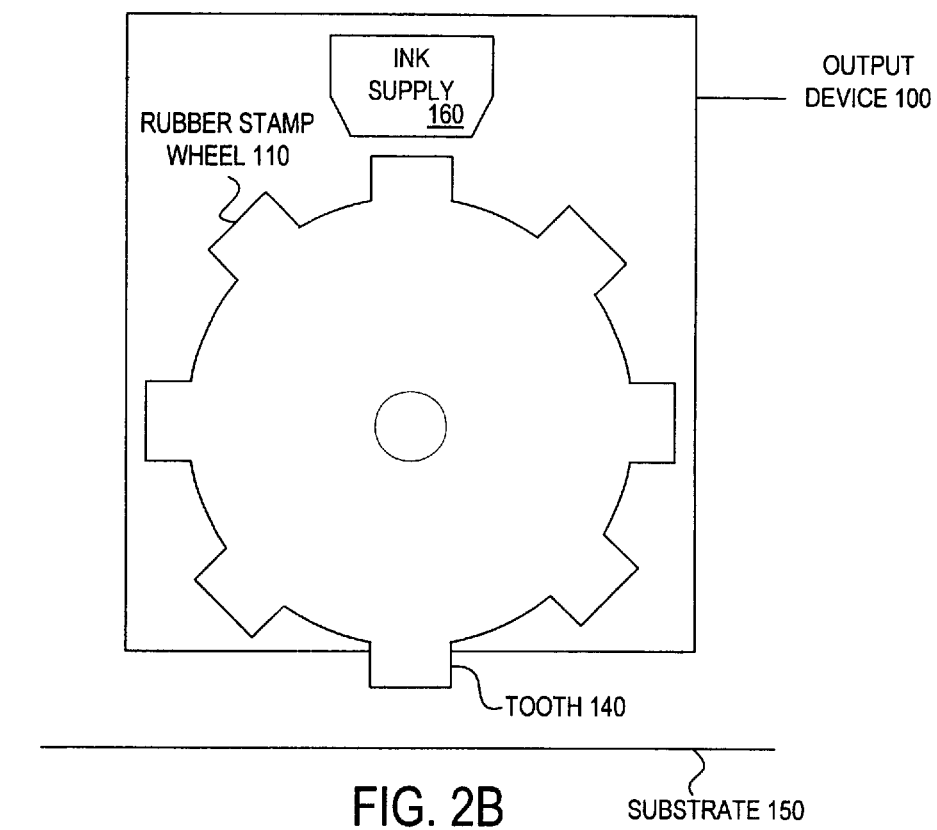

The timestamp is outputted through output device 100. For use in document timestamping, the output device 100 might be a printer for recording the timestamp onto a piece of paper. FIGS. 2A and 2B illustrate bottom and end views, respectively, of an exemplary printwheel device 100. Printwheel device 100 rotates rubber-stamp wheels 110 using geared motors 120 under control of an electrical control signal at input port 130. The wheels 110 have teeth 140 around their circumference to print an alphanumeric code when a selected sequence of teeth 140 is in contact with substrate 150. The teeth 140 receive ink from an ink supply 160. As mentioned previously, the timestamp would typically include some cryptographic function of the time, such as a hash or encrypted code, which one could use to verify the integrity and/or authenticity of the time. If used as a standalone device, the timestamping command could be given via a push button or could be generated automatically by pushing down on a spring-loaded housing enclosing printwheel device 100, much like currently available hand-held devices for document stamping. Access to the timestamping device could optionally be controlled by requiring an authorized password (e.g., via an alphanumeric keypad) before timestamping will occur.

Regardless of the configuration of the device, signal flows between the cryptoprocessor and the output device could be secured to provide additional assurance.

Timestamp Verification

Whether the timestamp is printed on a physical document for public display, recorded on media for confidential logging, or displayed once for human reading, its fundamental purpose is for verification by a party who did not necessarily witness the timestamping.

In cases where the timestamp is hashed, the recipient need only read the cleartext time and recompute the hash to verify the timestamp. If the received and recomputed hashes agree, the time has not been changed.

In cases where the timestamp is encrypted in the corresponding device private key, the recipient can then simply decrypt the timestamp and perform any other cryptographic operations needed to verify the timestamp. The recipient would look up the corresponding public key from a public database, read the timestamp from the document, decrypt the timestamp using the public key, and determine and verify the document creation time. Alternatively, as suggested earlier, digital certificates could be used to distribute the device public key to a timestamp recipient.

In certain situations, the above procedures are not possible—for example: 1) when public key cryptography is not used, 2) when it is desired to keep the cryptographic algorithms confidential from the recipient, or 3) when the recipient lacks the capability to perform cryptographic verifications. In such cases, the verification can be implemented by a public database located on a central computer accessible via a free or toll-based telephone line. A caller would use his touch-tone keypad to enter the time, the date, and the timestamping ID number device. He could optionally also enter the timestamp. The central computer would use the ID number to look up the database record for that particular device, retrieve its cryptographic key, and use the cryptographic key to perform the appropriate cryptographic operation (recomputed hash, decryption, etc.) and provide a confirmation to the caller.

In general, the recipient will verify the timestamp by performing some combination of hashing and decryption appropriate to the particular combination of cryptographic operations used to create the timestamp.

Alternative Time Sources

It was mentioned previously that the time is generated via an internal clock 20. In another embodiment of the invention, the timestamping device could obtain time from an external source via signal receiver 24 disposed inside the secure perimeter 70. The signal receiver 24 could receive time signals from ground stations (e.g., the US Naval Observatory atomic clock), from orbiting satellites, or from any other trusted external time source. External time signals are especially advantageous for deterring hacking of an internal clock.

In the satellite example, the timestamping device could receive timing signals from the American Global Positioning System (GPS), for which sensors (receivers) are widely available on the commercial market. Alternatively, the receiver could receive signals from the Russian Glonass system. Although GPS is primarily used for location finding, those skilled in the art will appreciate that the same timing signals can also be used as an accurate time source. Consequently, the signal receiver 24 may be as an alternative time generator to clock 20. These basic operating principles of satellite ranging systems are well known (e.g., Herring, "The Global Positioning System," Scientific American, February 1996, pp. 44–50; and "How Does GPS Work?," Jane's Intl. Defense Review, December 31, 1994, p. 147) but will be briefly summarized below to illustrate the dual location- and time-determining capabilities of GPS.

Any signal sent from a satellite to a terrestrial receiver is delayed by an amount proportional to the distance from the satellite to the receiver. Therefore, the difference between a clock signal sent from a satellite and a receiver's local clock (typically a few hundredths of a second) will determine the distance from the satellite to the receiver. Knowing this distance establishes that the receiver is located somewhere on the surface of a sphere, of radius equal to the determined distance, centered about the satellite. However, the receiver's exact location—a particular point on the surface of that sphere—remains undetermined. By receiving signals from several orbiting satellites, the receiver's exact three-dimensional location on the surface of the earth can be determined as the point of intersection of all their locating spheres.

In practice, the receiver clock is cheaper, and therefore less accurate, than the satellites, highly accurate atomic clocks. This means that all of the locating spheres will be slightly smaller or larger than their true values, depending on whether the receiver clock runs slow or fast, respectively. Consequently, the location spheres may not intersect at a single point. This difficulty is overcome by adjusting the receiver clock by an arbitrary amount, which in turn changes each of the location radii by the same amount, and to check for a single point of intersection of the locating spheres. If not, the receiver clock is readjusted, in an iterative process, until a single point of intersection is found. That is, the inaccurate receiver clock provides a good initial guess regarding the point of intersection, and the fact that the locating spheres must intersect at a single point corresponding to the receiver's terrestrial location is used to improve the initial guess. Taken to its extreme, such iteration could be performed without requiring a receiver clock at all—this would simply require more iterations than if the receiver clock had been available to provide an initial guess.

The end result of the iteration process is a determination of both the exact location of the receiver and the correct time. This time can then be used as part of the timestamping process. Of course, if high time accuracy is not required (the received GPS time is only off by a few hundredths of a second), the timestamping device could simply accept the received satellite clock signal (or an average of several such signals) as an approximation to the correct time without performing the iterative process described above.

Finally, as is currently done for certain military applications, the received time signals could be encrypted in the time transmitter's private key, or in the receiver's public key, as an extra measure of assurance that an impostor has not substituted an incorrect time for that of the broadcast source. In the latter example, the broadcasted time signal may be thought of as narrowcasted because only a specific recipient can decrypt the time. In such applications, the cryptoprocessor 10, RAM 30 and memory 40 may be used to perform the necessary decrypting (or other decoding). It will be advantageous to dispose the receiver within the secure perimeter to prevent insertion of fraudulent signals. Alternatively, an encrypted time could be certified without prior decryption, with this step to be performed by the recipient during subsequent verification.

As the foregoing illustrates, the signal receiver 24 could either supplement or replace the clock 20. In certain embodiments, the clock 20 could be used to double-check the received time (or vice-versa) by comparing the received time against the internal clock time—which could have been set at the factory or by a previous radio broadcast. The received time would be deemed accurate provided the two times agreed to within the cumulative inaccuracies of the received signal (external time source inaccuracy plus any uncorrected transmission delay) and the internal clock 20. Such double-checking might be especially useful where the GPS signals are broadcast in slightly degraded form (e.g., the Standard Positioning mode used in many commercial applications).

Authenticated Location

In certain cases, it will be desired to certify both the time and geographical location at which the document was timestamped. As discussed above with respect to external time, the GPS signal receiver 24 is also ideally suited to provide the necessary location signals. Such signals would be incorporated into the timestamp, either as cleartext and/or cryptographic form.

Alternative Output Devices

More sophisticated printers can also be used in addition to the simple printwheel mechanism described above. For example, the printer could include traditional dot-based (e.g., laser, bubble, inkjet, or line printers) or character-based computer printers (e.g., daisywheel), as well as dot-based document printers (e.g., facsimile machines, photocopiers, or even barcode printers). Each of these devices could send a timestamping request through input 12, either automatically upon document printing or manually upon operator request (e.g., a "certify" button to be used manually upon printing a page). Furthermore, manual or automatic operation could be selectable via an on-off timestamp toggle.

Many other output devices are possible, especially when the timestamp is not required to be directly printed on a paper substrate. For example, the output device could print a special, difficult-to-forge label to be applied to the surface of a paper document or other substrate. Furthermore, the timestamp has been described previously as a human-readable alphanumeric code, but this is not necessary. Any machine-readable, optically-detectable code would serve equally well, and might be preferred to deter casual snooping. For example, the timestamp could be a fine mesh of dots in a geometric pattern covering the entire document. The dots would be small enough to allow easy viewing of the document while at the same time making it much more difficult to change any of the words in the document since the dots would be laid over the text. The dots could be laid down using any arbitrary machine-readable coding scheme. For example, the distance between individual dots could represent the digits of the coded portion of the timestamp. Such an embodiment is most practically performed by a timestamping device connected to a printer or fax machine which is easily capable of setting down such a fine mesh of dots. Machine-readable, optically-detectable codes are also appropriate when the output device is a recorder used for writing the timestamp to a non-paper medium. Certain of these media have an added advantage of being write-only, which can provide extra assurance against timestamp modification. For example, a laser could write to optical media (e.g., CD-ROM or magneto-optical disk). Like paper, such write-only media are often permanent or semi-permanent in nature. Finally, the timestamp need not be written to a permanent or semi-permanent media, but could be displayed for transient viewing on an electronic or other display in human- or machine-readable form.

Note that, just as with conventional timestamping devices, the timestamp does not attest to the authenticity of the timestamped document, only when the timestamp was appended. For example, a fraudulent user could still copy a legitimate timestamp from a first document to a second document and present the falsely timestamped second document to an unsuspecting recipient. Nevertheless, by providing added assurance as to the timestamp, the timestamping device disclosed herein represents a distinct improvement over conventional timestamping devices which provide assurance of neither the timestamp nor the document. Timestamp copying can be further discouraged by the use of special measures such as write-once media (as discussed above) for timestamping electronic documents or uncopyable inks for timestamping paper documents. Examples of uncopyable (but ultimately optically detectable) inks include: 1) specially colored inks that can not be detected by photocopy machines, 2) so-called "invisible" inks that appear upon application of a chemical or ultraviolet developer, and 3) delayed-visibility inks that are initially invisible but develop slowly over time in response to aging or light exposure. The term "uncopyable inks" could also include timestamps that can be copied with less than full fidelity, e.g., inks that fade, change color, or change contrast upon copying. Finally, the timestamping device could print "uncopyable patterns" that exhibit interference patterns or other optical distortions upon copying. Such uncopyable inks or uncopyable patterns would be especially useful where timestamped documents are to be transmitted via unsecure courier. Those skilled in the art will appreciate that these and other types of anti-counterfeiting measures can increase the difficulty of successfully copying an original timestamp onto another document.

Yet another type of fraud involves modifying the document data rather than the timestamp—for example, timestamping a document and later altering the document content, or pre-timestamping blank pages to be printed at a later time. Such fraud can be discouraged by the use of inks or patterns whose physical characteristics (e.g., reflectivity, refractivity, contrast, color or hue) depend on whether the timestamp is applied on top of printing, or printing is done on top of a timestamp. Preferably, the timestamp will normally be applied over portions of the printed document to be protected, and any attempt to overprint the timestamp with other printing will be optically detectable. The timestamp could even be restricted to only the printed portion of a page, to discourage the addition of new text atop a previously timestamped but otherwise blank portion of the page. Restricting the timestamp to only the printed portion of the page could easily be implemented in connection with a facsimile printer, computer printer, or any other device capable of outputting a timestamp of arbitrary size. If the timestamping device produces a timestamp of fixed size, and a single timestamp is smaller than the portion of the printed document that is to be protected, multiple applications of the timestamp may be used. Alternatively, the printwheel device of FIG. 2 could be adapted to operate in a continuous fashion (e.g., a roller) for timestamping atop text of arbitrary size. Any of the aforementioned fraud detection techniques shall be referred to as "overprint detection."

Augmented Timestamps

The aforementioned techniques—uncopyable inks, uncopyable patterns and overprint detection—are examples of physical techniques that may be used to deter fraud. Besides physical techniques, informational techniques may also be used to deter fraud. Informational techniques involve incorporating information about the document, in the form of 1) content identifiers, 2) witness identifiers, or 3) time bracketing into the timestamp.

In a simple form of content identifier, a timestamping device operator could count the number of words on the document to be timestamped and then enter this number into the timestamping device. Data input could be conducted through a numeric keypad attached to the device. When the timestamp was then generated by the cryptographic processor, the coded portion of the timestamp would include an encrypted version of the number of words in addition to the date. Other data elements that could be incorporated into the timestamp include the number of lines of text, the number of instances of a particular word, the largest dollar amount, the number of pages in the document, etc. Such information incorporated into the timestamp makes it increasingly difficult for anyone to undetectibly modify the original document. The memory of each timestamping device could contain a database of 100 data element categories as described above. A printed copy would be available to the timestamping device user. The user would simply decide which data element to incorporate, enter the index number of the data element database, and then enter the numeric value of the data element. Upon authentication of the timestamp, the data element would be revealed.

The content identifier could also include information about the document in the form of various timestamp color schemes. A blue timestamp, for instance, could indicate a financial document while red was reserved for legal documents. The timestamping device operator would enter a code such as 01 for finance, 02 for legal, 03 for contracts, etc. The timestamping device would incorporate this information into the color of the timestamp, perhaps using separate colors for the clear text and coded text portions of the timestamp. As shown by the foregoing examples, those skilled in the art will appreciate that any identifiable datum reflective of document content can be used as the content identifier.

In addition to providing a degree of document integrity, timestamps could include information about those individuals present at the time the timestamp was affixed to the document. In a simple form of witness identifier, each witness to the event enters a unique private identifier (such as his private key or personal ID number) into the timestamping device before the timestamp is affixed to the document. The private identifier is then incorporated into the coded portion of the timestamp. The private identifier could be entered manually via a keypad, or automatically via touch memory buttons (described in more detail below), PCMCIA cards, or other portable personal access tokens.

If greater levels of security are required, a challenge-response protocol can be used to verify that none of the event witnesses has stolen another person's private identifier. After entering his private identifier, a witness would be challenged by the timestamping device to enter an additional piece of information, such as his mother's maiden name. The response would be compared against its expected value stored in a database in the memory of the timestamping device when the private identifier was first registered with the device. Incorrect responses would invalidate the previously entered private identifier.

In the above embodiments, users must be careful when entering private identifiers to ensure that they are not stolen by other users of the timestamping device. To make this process more secure, tokens such as the Touch Memory device manufactured by Dallas Semiconductor can be used. Each timestamping device user would have his private identifier stored in a Touch Memory button which consists of a computer chip housed within a small button shaped stainless steel case. The case may be ring-shaped and worn around a user's finger. The chip contains up to 64 kb of RAM or EPROM, sufficient to store a plurality of cryptographic keys. The device transmits data bidirectionally at 16.3 kb per second when placed into contact with a reader device, which would reside within the timestamping device. The user touches the button device to the reader each time that he wants his private identifier incorporated into the timestamp. Each chip contains a unique serial number that is laser-etched into the chip at the time of manufacture. The DS1427 configuration includes a tamper-resistant real-time clock that may be utilized as a supplementary audit trail in the timestamping device, so that authenticatable information would also be stored in the user's Touch Memory button in addition to being incorporated into the coded portion of the timestamp.

Still greater levels of security can be obtained if biometric readers are built into the timestamping device for 106 incorporating biometric data (e.g., fingerprint, retinal pattern or any other unique physiological parameter) into the coded portion of the timestamp. Biometric readers could also be used to authenticate the private identifiers that are entered by all witnesses.

Yet another informational technique could be used to temporarily bracket access by the timestamp operator. In this technique, a timestamp would indicate an open date and a close date, creating a virtual open parenthesis or closed parenthesis within the coded portion of the timestamp. For example, a professional working on a document might need to show the starting and ending times in order to determine billable hours. The timestamping device could have separate buttons labeled start and stop. The start button would be pressed before stamping a document, with such indication being incorporated into the coded portion of the timestamp. The document would then be changed, and the close timestamp would be placed over the open timestamp.

Alternate Timestamping Commands

It was mentioned previously that output device 100 could generate the timestamp upon external command. Although such an external command will often be a request from a timestamp recipient, it could also be generated automatically upon detection of an event (or measurement) external to the timestamping device by an appropriate sensor acting as input device 12. Such an event could be any normal or abnormal occurrence whose time of occurrence is to be recorded.

For example, in automobile applications, normal events might include entering an automated toll road or a police car passing a prescribed checkpoint, while abnormal events might include a rental car leaving an authorized operating area or air bag inflation during an accident. In any of the aforementioned examples, a sensor would detect the triggering event and automatically order the timestamp generation. The sensor could take many different forms, ranging from a simple photodiode (e.g., detecting a laser beam marking a boundary) to a GPS receiver (e.g., used as a location finder subject to predetermined alarm limits). In addition, the sensor could be located either within the timestamping device (e.g., analogous to a "flight recorder"), or externally (e.g., a central monitoring station). Where the sensor is external, it would transmit a timestamp request to a receiver, disposed within the timestamping device, acting as input device 12. In a variation of the above-mentioned location finder, the GPS receiver could be linked to a transmitter for broadcasting the car's location upon receipt of an authorized command at a sensor. Considered together, the GPS receiver, transmitter, and airbag sensor could be regarded as a transponder. The actual transmitters, receivers, and sensors needed for such location transmitters will not be discussed in detail, as those skilled in the art will appreciate that all the necessary components are widely commercially available. For example, the Lojak car anti-theft system uses such components—but without cryptographically assured timestamping—to transmit a stolen car's location upon command of a radio signal. Finally, the timestamping device could be augmented with electromechanical circuitry to take additional action automatically upon detecting the triggering event. For example, a common application might be an automatic cut-off (a kind of "dead man's switch") to disable an engine in the event of emergency or straying outside a prescribed region.

Although the above examples have been given primarily in the document production and automotive contexts, those skilled in the art will appreciate that the same technology can be used in any other monitoring applications where the time of occurrence of an event is to be recorded.

For purposes of illustration only, and not to limit generality, the present invention has been explained with reference to various examples of time sources, cryptographic operations, output devices, and sensors. However, one skilled in the art will appreciate that the invention is not limited to the particular illustrated embodiments or applications, but includes many others that operate in accordance with the principles disclosed herein.

What is claimed is:

1. An apparatus for secure document timestamping, comprising:

a time generator for generating a representation of the time;

a computing device, including a computer processor and a memory, coupled to receive the representation of the time from the time generator and programmed to perform a cryptographic operation on the representation of the time to produce a timestamp;

an output device, coupled to the computing device, for outputting the timestamp in optically detectable form to a physical document in response to automatic detection by the apparatus of a triggering event; and means for rendering at least one of the time generator and the computing device resistant to tampering.

2. The apparatus of claim 1, wherein the computing device is programmed to automatically detect the triggering event based on a schedule stored in the memory.

3. The apparatus of claim 2, wherein the computing device automatically detects a series of triggering events based on the schedule, and the output device is for outputting a unique timestamp in response to each of the triggering events.

4. The apparatus of claim 3, wherein the schedule has regular intervals.

5. The apparatus of claim 3, wherein the schedule has irregular intervals.

6. The apparatus of claim 2, wherein the schedule is predetermined.

7. The apparatus of claim 6, wherein the schedule has predetermined times.

8. The apparatus of claim 2, further comprising an input device coupled to the computing device for receiving input signals representing the schedule, wherein the computing device loads the schedule into the memory based on the input signals.

9. The apparatus of claim 8, wherein the input signals received by the input device includes a request encrypted using a key for loading the schedule.

10. The apparatus of claim 2, wherein the computing device is further programmed to modify the schedule in response to detection of a targeted event.

11. The apparatus of claim 10, wherein the computing device accelerates the schedule in response to the detection of the targeted event.

12. The apparatus of claim 1, further comprising means for automatically detecting a series of triggering events, and the output device is for outputting a unique timestamp in response to each of the triggering events.

13. The apparatus of claim 1, wherein the computing device is programmed to automatically detect the triggering event based on a previously output timestamp.

14. The apparatus of claim 1, wherein the output device includes a document production device, the triggering event is the production of the physical document by the document production device, and the timestamp is output to the physical document upon its production.

15. The apparatus of claim 1, wherein the output device includes a document production device, the document production device includes a certify button, and the timestamp is output upon manual activation of the certify button.

16. The apparatus of claim 15, wherein the document production device further includes an on-off timestamp button, and wherein automatic timestamp output on production of the physical document and manual timestamp output on manual activation of the certify button is selectable by actuating the on-off timestamp button.

17. The apparatus of claim 14, wherein the document production device is a printer and the timestamp is automatically output on printing of the physical document.

18. The apparatus of claim 17, wherein the printer is a computer printer.

19. The apparatus of claim 17, wherein the printer is a document printer.

20. The apparatus of claim 17, wherein the printer is a facsimile machine, the timestamp is automatically output on printing of a facsimile by the facsimile machine.

21. The apparatus of claim 17, wherein the printer is a photocopier, the timestamp is automatically output on printing of a photocopy by the photocopier.

22. The apparatus of claim 17, wherein the printer is a barcode printer, the timestamp automatically output on printing of a barcode by the barcode printer.

23. The apparatus of claim 1, further comprising a sensor for generating a sensed signal, wherein the timestamp is output in response to automatic detection of the triggering event based upon the sensed signal.

24. The apparatus of claim 23, wherein the sensed signal represents an event external to the apparatus, the timestamp occurring based on the external event.

25. The apparatus of claim 24, wherein the external event is a normal occurrence whose time of occurrence is to be recorded.

26. The apparatus of claim 25, wherein the external event is selected from the group consisting of entering an automated toll road and passing a checkpoint.

27. The apparatus of claim 24, wherein the external event is an abnormal occurrence whose time of occurrence is to be recorded.

28. The apparatus of claim 27, wherein the external event is selected from the group consisting of leaving an authorized operating area and having an accident.

29. The apparatus of claim 23, wherein the sensor includes a GPS receiver.

30. The apparatus of claim 1, further comprising an electromechanical circuit for taking an additional action upon the automatic detection of the triggering event.

31. The apparatus of claim 30, wherein the electromechanical circuit is for automatically cutting-off a vehicle engine upon the detection of the triggering event.

32. The apparatus of claim 1, wherein the triggering event involves receiving a broadcast signal.

33. A method for secure document timestamping, comprising the steps of:

generating a representation of the time;

performing a cryptographic operation on the representation of the time to produce a timestamp;

automatically detecting a triggering event; and outputting the timestamp in an optically detectable form to a physical document in response to the automatic detection of the triggering event;

at least one of the steps of generating and performing being performed in a tamper-resistant environment.

34. The method of claim 33, wherein the step of automatically detecting the triggering event includes accessing a schedule.

35. The method of claim 34, wherein the step of automatically detecting the triggering event includes detecting a series of triggering events using the schedule, the outputting step including outputting a timestamp for each of the triggering events.

36. The method of claim 34, further comprising the step of modifying the schedule in response to detection of a targeted event.

37. The method of claim 33, wherein the step of automatically detecting the triggering event includes responding to a previously output timestamp.

38. The method of claim 33, further comprising the step of producing the physical document, wherein the step of automatically detecting the triggering event includes detecting the production of the physical document, and the step of outputting the timestamp includes outputting the timestamp upon the detected production of the physical document.

39. The method of claim 38, wherein the step of producing the physical document includes the step of printing a facsimile, and the step of outputting the timestamp includes automatically outputting the timestamp on printing the facsimile.

40. The method of claim 38, wherein the step of producing the physical document includes the step of printing a photocopy, and the step of outputting the timestamp includes automatically outputting the timestamp on printing the photocopy.

41. The method of claim 38, wherein the step of producing the physical document includes the step of printing a barcode, and the step of outputting the timestamp includes automatically outputting the timestamp on printing the barcode.

42. The method of claim 33, further comprising the step of receiving a sensed signal, wherein the step of outputting the timestamp is performed in response to automatic detection of the triggering event based on the sensed signal.

43. The method of claim 42, wherein the step of receiving a sensed signal includes receiving a signal representative of an occurrence of a normal event.

44. The method of claim 42, wherein the step of receiving a sensed signal includes receiving a signal representative of an occurrence of an abnormal event.

45. The method of claim 33, further comprising the step of taking an additional action upon the automatic detection of the triggering event.

46. An apparatus for secure document timestamping, comprising:

means for generating a representation of the time;

means for performing a cryptographic operation on the representation of the time to produce a timestamp;

means for automatically detecting a triggering event; and means for outputting the timestamp in an optically detectable form to a physical document in response to the automatic detection of the triggering event;

means for locating at least one of the generating means and the performing means in a tamper-resistant environment.

47. An apparatus for secure document timestamping, comprising:

a time generator for generating representations of the time;

a computing device coupled to receive the representations of the time from the time generator and programmed to perform a series of cryptographic operations on the representations of the time to produce timestamps;

an output device, coupled to the computing device, for outputting the timestamps in optically detectable form in response to a predetermined schedule; and means for rendering at least one of the time generator and the computing device resistant to tampering.

48. An apparatus for secure document timestamping, comprising:

a time generator for generating a representation of the time;

a computing device coupled to receive the representation of the time from the time generator and programmed to perform a cryptographic operation on the representation of the time to produce a timestamp;

a computer printer, coupled to the computing device, for printing a printed document and for automatically outputting the timestamp in optically detectable form to the printed document on printing the printed document; and means for rendering at least one of the time generator and the computing device resistant to tampering.

49. An apparatus for secure document timestamping, comprising:

a time generator for generating a representation of the time;

a computing device coupled to receive the representation of the time from the time generator and programmed to perform a cryptographic operation on the representation of the time to produce a timestamp;

a facsimile machine, coupled to the computing device, for printing a facsimile and for automatically outputting the timestamp in optically detectable form to the facsimile upon printing of the facsimile; and means for rendering at least one of the time generator and the computing device resistant to tampering.

50. An apparatus for secure document timestamping, comprising:

a time generator for generating a representation of the time;

a computing device coupled to receive the representation of the time from the time generator and programmed to perform a cryptographic operation on the representation of the time to produce a timestamp;

a photocopier, coupled to the computing device, for printing a photocopy and for automatically outputting the timestamp in optically detectable form to the photocopy upon printing of the photocopy; and means for rendering at least one of the time generator and the computing device resistant to tampering.

* * * * *